United States Patent
Gupta et al.

(10) Patent No.: US 11,368,095 B1
(45) Date of Patent: Jun. 21, 2022

(54) CONTINUOUS LOAD HIGH POWER FLYBACK CONVERTER

(71) Applicant: ABL IP HOLDING LLC, Atlanta, GA (US)

(72) Inventors: Ashish Kumar Gupta, North Andover, MA (US); Satish Chandupatla, Andover, MA (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 17/161,802

(22) Filed: Jan. 29, 2021

(51) Int. Cl.
  *H02M 3/335* (2006.01)
  *H05B 45/385* (2020.01)
  *H01F 30/04* (2006.01)
  *H01F 27/38* (2006.01)

(52) U.S. Cl.
  CPC ...... *H02M 3/33507* (2013.01); *H05B 45/385* (2020.01); *H01F 27/38* (2013.01); *H01F 30/04* (2013.01); *H02M 3/3353* (2013.01); *H02M 3/33523* (2013.01)

(58) Field of Classification Search
  CPC ......... H02M 3/33507; H02M 3/33523; H02M 3/3353; H05B 45/385; H01F 27/38; H01F 30/04
  See application file for complete search history.

(56) References Cited

U.S. PATENT DOCUMENTS

| 6,956,748 B2 * | 10/2005 | Nakagawa | ........ H02M 3/33569 363/16 |
| 2008/0212341 A1 | 9/2008 | Moiseev | |
| 2011/0019439 A1 * | 1/2011 | Lee | ................... H02M 3/33569 363/16 |
| 2012/0163058 A1 * | 6/2012 | Kamata | .................... H02H 3/33 363/131 |
| 2014/0268966 A1 * | 9/2014 | Kamata | .................... H01F 3/14 363/131 |

(Continued)

OTHER PUBLICATIONS

Pittini, Riccardo et al., "Primary Parallel Secondary Series Flyback Converter (PPSSFC) with Multiple Transformers for Very High Step-Up Ratio in Capacitive Load Charging Applications," IEEE Applied Power Electronics Conference and Exposition, Mar. 2014 (8 pages).

*Primary Examiner* — Jue Zhang
(74) *Attorney, Agent, or Firm* — Kilpatrick Townsend & Stockton LLP (57) ABSTRACT

A continuous load high-power flyback converter includes a first transformer having a first primary winding, a first secondary winding, and a first auxiliary winding, and a second transformer having a second primary winding, a second secondary winding, and a second auxiliary winding. The first primary winding and the second primary winding are connected in parallel between a power source and a transistor. The first secondary winding and the second secondary winding are connected in series to a diode and form an output of the continuous load high-power flyback converter. A load is connected between the output and ground. The first auxiliary winding and the second auxiliary winding are connected in series, and used to generate a control signal for the transistor. Connecting the primary windings in parallel and the secondary windings in series reduces the reflected voltage on the transistor for a given output voltage.

13 Claims, 9 Drawing Sheets

(56) References Cited

U.S. PATENT DOCUMENTS

2015/0271906 A1\* 9/2015 Kamata ................... H02M 1/00
 315/111.21
2018/0146524 A1 5/2018 Lin et al.

\* cited by examiner

CONTINUOUS LOAD HIGH POWER FLYBACK CONVERTER

TECHNICAL FIELD

This present application relates to electric converters and, more particularly, to a continuous load high-power flyback converter.

BACKGROUND

Flyback converters are widely used for low power (typically less than 75 Watts) AC-DC or DC-DC applications, due to the low component count and low complexity. For continuous load higher power applications, this topology becomes less attractive due to the physical size limitations of the magnetic cores.

Figure 1:
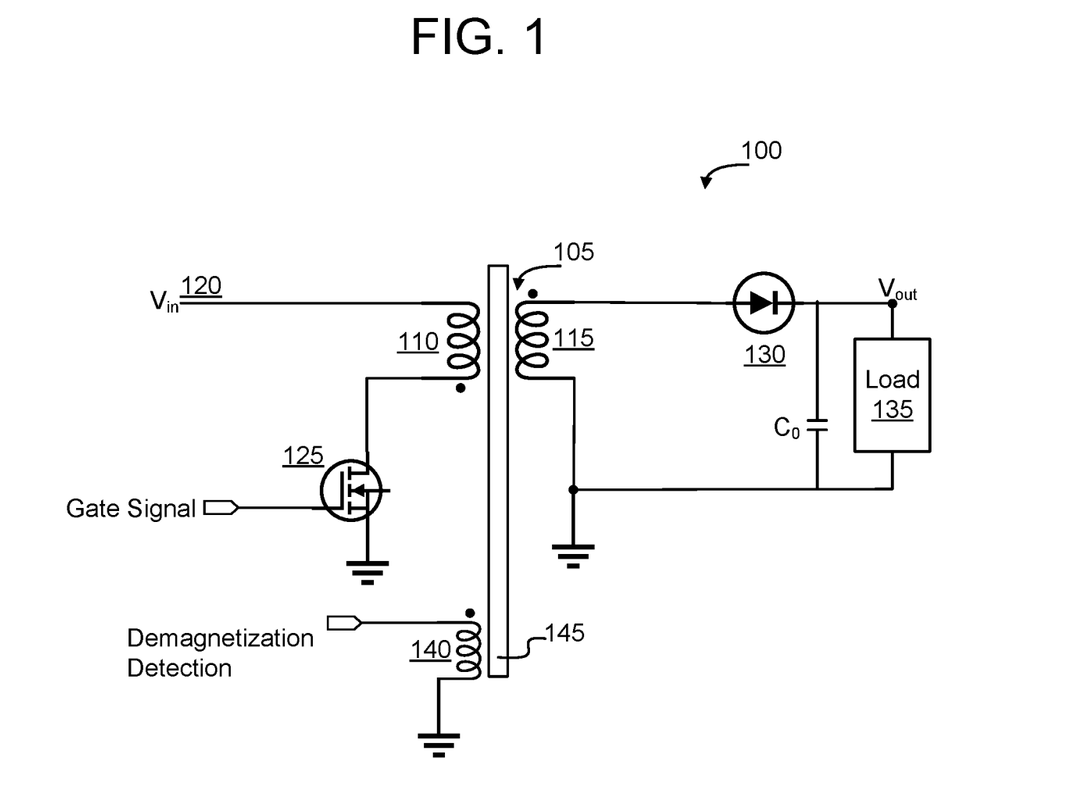
FIG. 1 is a circuit diagram of an example conventional flyback converter.

FIG. 1 shows a conventional flyback converter 100. As shown in FIG. 1, a flyback converter 100 has a transformer 105 having a primary winding 110, a secondary winding 115 and a magnetic core 145. The primary winding 110 is connected between a power source 120 and transistor 125. The power source may be a DC power source or an AC power source that has been passed through a rectifier. An example transistor 125 may be a Mosfet, although other types of transistors 125 or switches may be used. The secondary winding 115 of transformer 105 is connected to a diode 130 and forms an output $V_{out}$ of the flyback converter 100. A capacitor Co and a load is connected 135 is connected between the output $V_{out}$ of the transformer 105 and ground.

Figure 2:
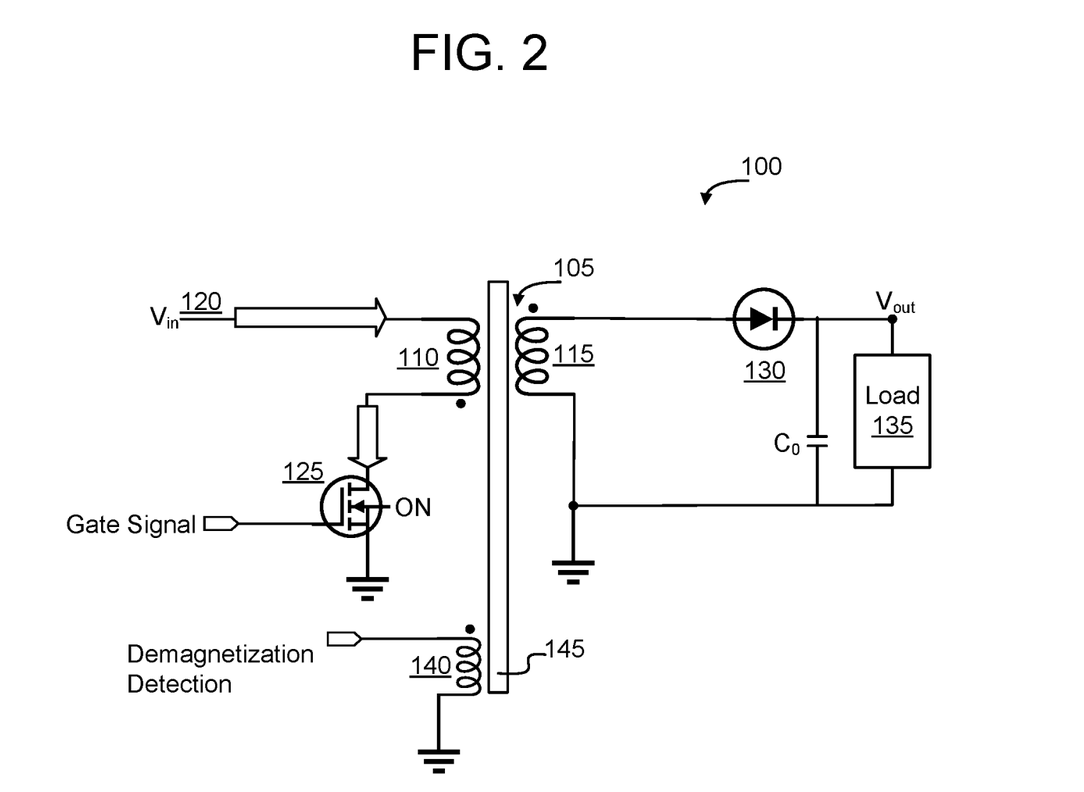

FIG. 2 shows the flow of current in the flyback converter 100 when the transistor 125 is turned ON. As shown in FIG. 2, when the transistor 125 is turned ON, current flows through the primary winding 110 of the transformer 105, such that the transformer 105 is magnetized and stores energy. The diode 130 is OFF during this phase due to the negative polarity on the secondary winding 115.

Figure 3:
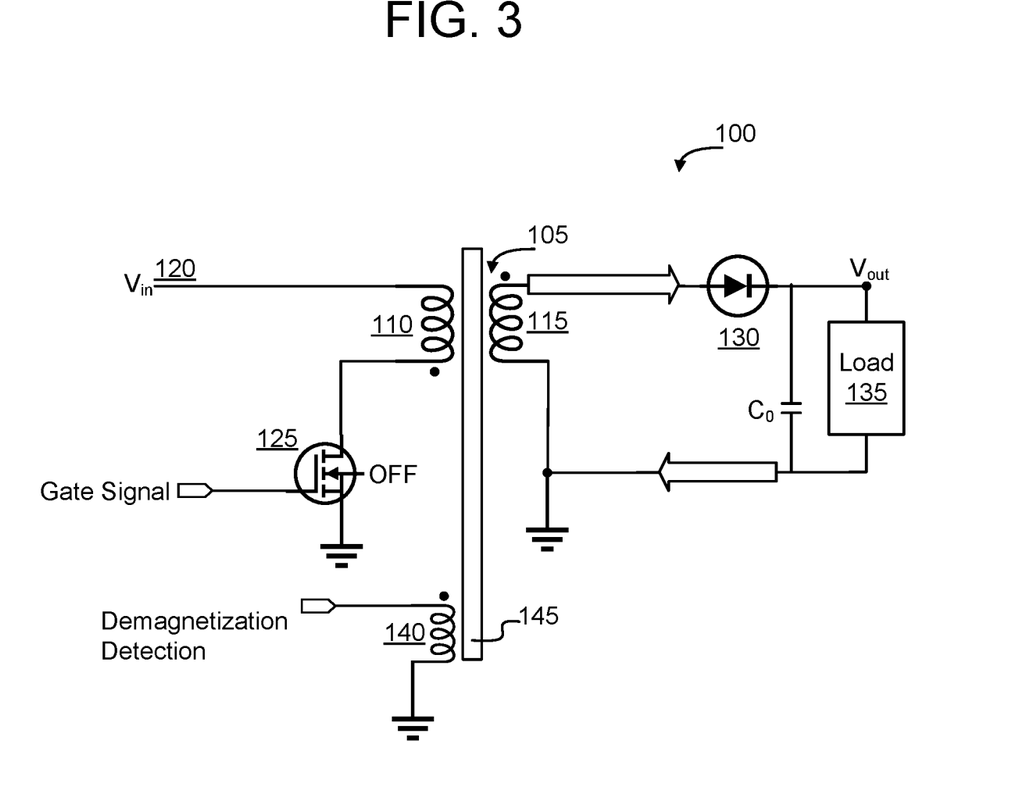
FIG. 3 is a circuit diagram of the example conventional flyback converter of FIG. 1, showing the flow of electricity when the transistor is turned OFF.

FIG. 3 shows the flow of current in the flyback converter 100 when the transistor 125 is turned OFF. As shown in FIG. 3, when the transistor 125 is turned OFF, the diode 130 starts to conduct due to the reversal of polarity on the secondary winding 115, and the energy stored in the transformer 105 is released to the load 135.

While the transistor is turned OFF, an output voltage is reflected (Vref) on the primary winding 110 of the transformer 105, which is based on the number of windings of the primary winding 110 (Np) divided by the number of windings of the secondary winding (Ns) times the sum of the output voltage across the load (Vo) plus diode 130 forward voltage (Vd): Vref=(Np/Ns)*(Vo+Vd). The stress voltage (Vdss) on the transistor 125 is determined by adding the input voltage (Vin) from power source 120, the reflected voltage Vref, and a leakage inductance voltage spike (Vlkg): Vdss=Vin+Vref+Vlkg.

After the power stored in the transformer 105 has been transferred to the load 135, the voltage on the secondary winding 115 will start to approach zero. As shown in FIG. 1, in some implementations the transformer 105 of the flyback converter 100 includes an auxiliary winding 140 which is used to detect the voltage across the secondary winding 115. Specifically, the auxiliary winding 140 reflects the voltage of the secondary winding 115. When the current across the secondary winding 115 approaches zero, the auxiliary winding 140 will start ringing, caused by resonance between the primary inductance of the transformer 105 and parasitic lumped capacitance. This ringing can be used to detect demagnetization of the transformer 105 to cause the transistor 125 to be turned ON again. This type of control technique is known as quasi-resonance control operation.

The output power that a flyback converter 100 is able to provide depends on the size of the magnetic core 145 used in the transformer 105. As the output power requirements increase, for example once the required output power exceeds around 75 Watts, the physical size of the magnetic core 145 may dictate the use of an alternate converter topology. Accordingly, it would be advantageous to provide a new design of a continuous load high-power flyback converter.

SUMMARY

All examples and features mentioned below may be combined in any technically possible way.

Various implementations disclosed herein include a continuous load high-power flyback converter, including a first transformer having a first primary winding, a first secondary winding and a first auxiliary winding, a second transformer having a second primary winding, a second secondary winding, and a second auxiliary winding, a transistor, and a diode, in which the first primary winding and the second primary winding are connected in parallel between a power source and the transistor, the first secondary winding and the second secondary winding are connected in series with the diode to form an output terminal of the continuous load high-power flyback converter for supplying continuous output power to a load, and the first auxiliary winding and the second auxiliary winding are connected in series and used to generate a control signal to control an ON/OFF state of the transistor. Connecting the primary windings in parallel and the secondary windings in series enables a higher amount of power to be continuously delivered to the load, while reducing the reflected voltage on the transistor.

In some implementations, the continuous load high-power flyback converter further includes the load, in which the load is an LED (Light Emitting Diode) array. In some implementations, the LED array has a plurality of LEDS. In some implementations, the continuous load high-power flyback converter is a stepdown converter. In some implementations, the first transformer has a first magnetic core, and wherein the second transformer has a second magnetic core. In some implementations, the first and second transformers are configured such that voltage levels on the first and second auxiliary windings respectively correlate to voltage levels on the first and second secondary windings. In some implementations, the control signal causes the transistor ON/OFF state to alternate between ON and OFF to implement a quasi-resonance control operation of the continuous load high-power flyback converter.

Further implementations disclosed herein include a lighting device that includes a continuous load high-power flyback converter having an input terminal and an output terminal and an LED (Light Emitting Diode) array connected to the output terminal. The continuous load high-power flyback converter includes a first transformer having a first primary winding, a first secondary winding and a first auxiliary winding, a second transformer having a second primary winding, a second secondary winding, and a second auxiliary winding, a transistor, and a diode, in which the first primary winding and the second primary winding are connected in parallel between a power source and the transistor, the first secondary winding and the second secondary winding are connected in series with the diode to form the output terminal, and the first auxiliary winding and the second auxiliary winding are connected in series and used to generate a control signal to control an ON/OFF state of the transistor.

In some implementations, the LED array has a plurality of LEDS. In some implementations, the continuous load high-power flyback converter is a stepdown converter. In some implementations, the first transformer has a first magnetic core, and wherein the second transformer has a second magnetic core. In some implementations, the first and second transformers are configured such that voltage levels on the first and second auxiliary windings respectively correlate to voltage levels on the first and second secondary windings. In some implementations, the control signal causes the transistor ON/OFF state to alternate between ON and OFF to implement a quasi-resonance control operation of the continuous load high-power flyback converter.

BRIEF DESCRIPTION OF THE DRAWINGS

These and other features of the present implementations will be understood better by reading the following detailed description, taken together with the figures herein described. In the drawings, each identical or nearly identical component that is illustrated in various figures may be represented by a like numeral. For purposes of clarity, not every component may be labeled in every drawing.

FIG. 2 is a circuit diagram of the example conventional flyback converter of FIG. 1, showing the flow of electricity when a transistor forming part of the flyback converter is turned ON.

FIG. 5 is a circuit diagram of the example continuous load high-power flyback converter of FIG. 4, showing the flow of electricity when a transistor forming part of the continuous load high-power flyback converter is turned ON.

DETAILED DESCRIPTION

This disclosure is based, at least in part, on the realization that it would be advantageous to provide a continuous load high-power flyback converter.

Figure 4:
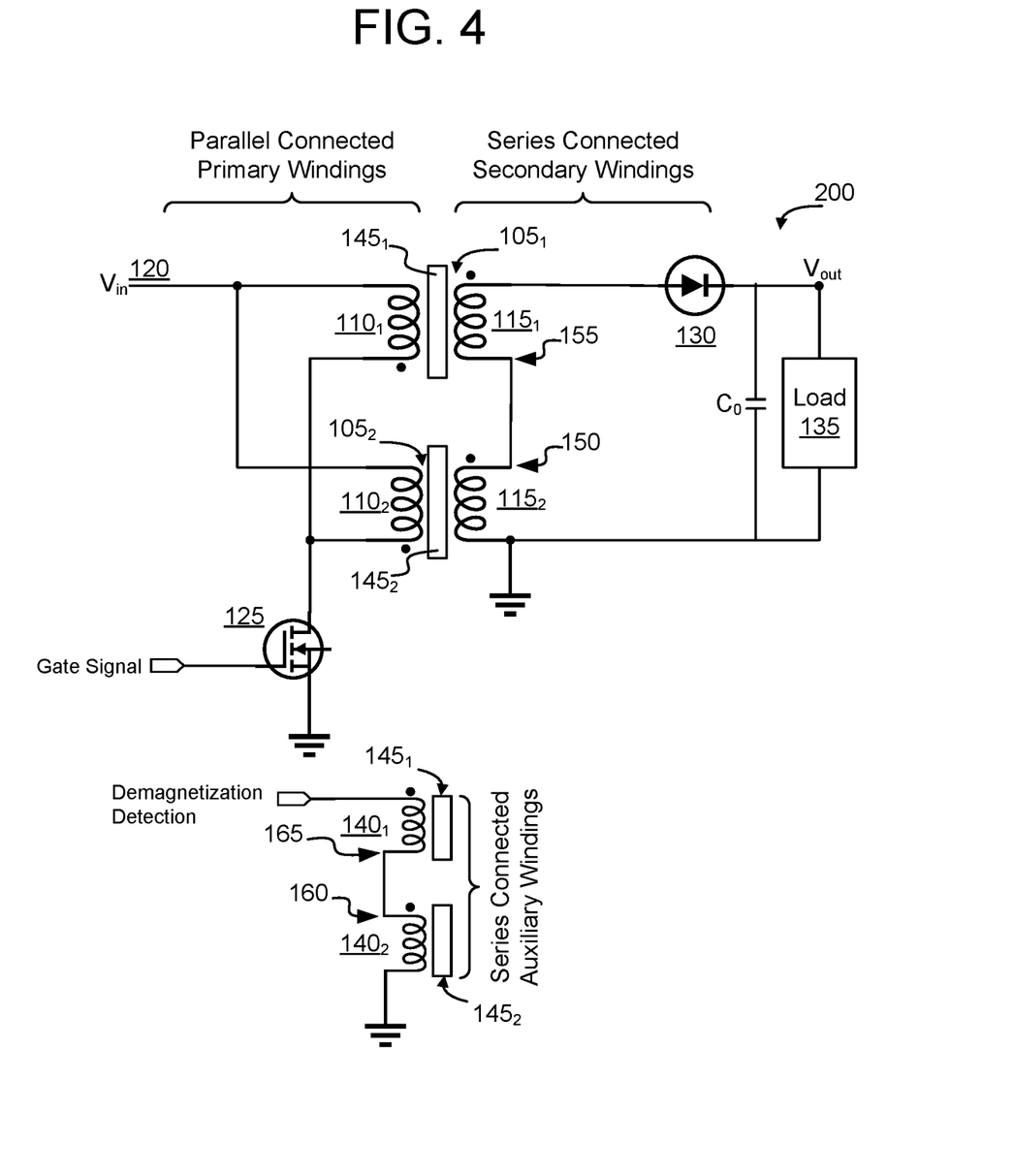
FIG. 4 is a circuit diagram of an example continuous load high-power flyback converter, according to some implementations.
Figure 7:
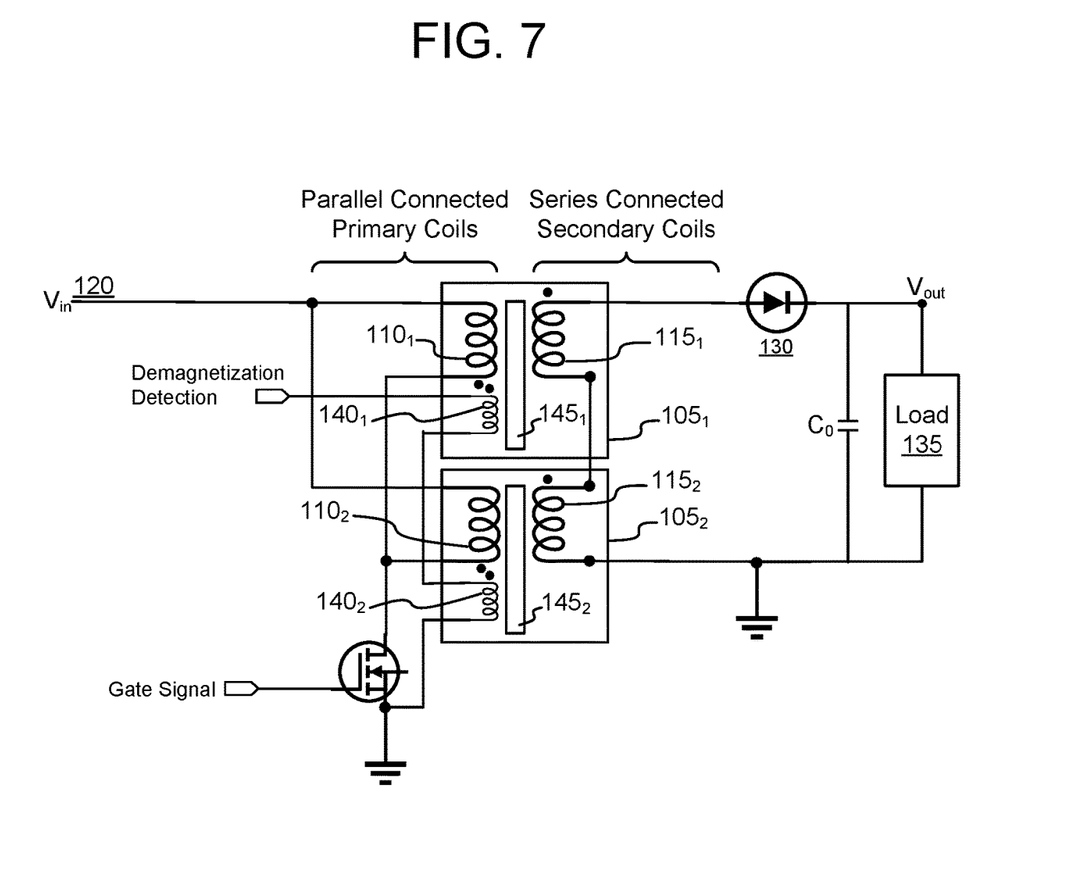
FIGS. 7 and 8 are circuit diagrams of example continuous load high-power flyback converters, according to some implementations.
Figure 8:
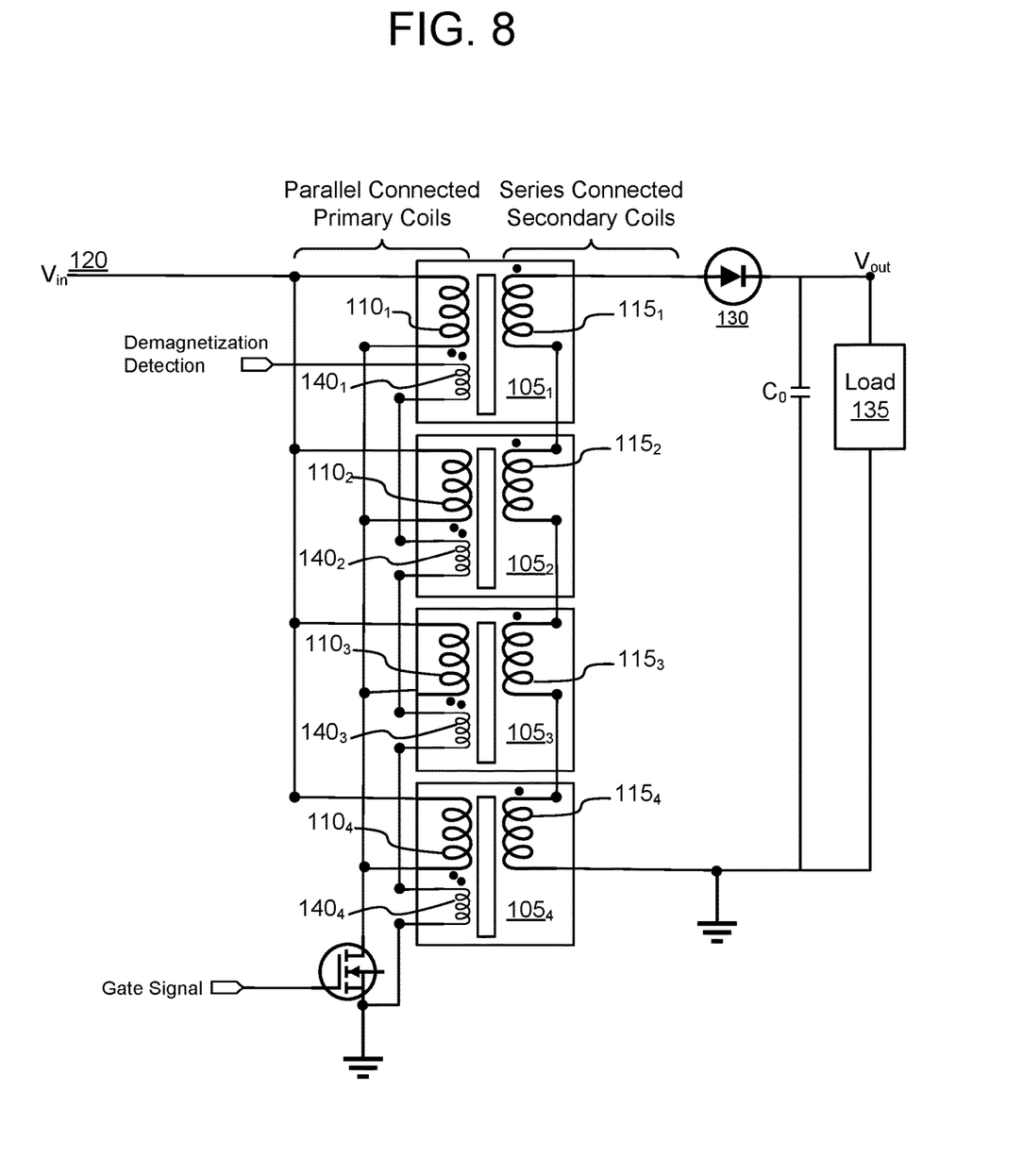

FIG. 4 is a circuit diagram of an example continuous load high-power flyback converter 200, according to some implementations. As shown in FIG. 4, in some implementations the continuous load high-power flyback converter 200 has two or more transformers $105_1$, $105_2$. Although the continuous load high-power flyback converter 200 shown FIG. 4 has only two transformers 105, in some implementations the continuous load high-power flyback converter 200 may have more than two transformers 105, for example as shown in FIG. 8. The first transformer $105_1$ has a primary winding $110_1$, a secondary winding $115_1$, and an auxiliary winding $140_1$. The second transformer $105_2$ has a primary winding $110_2$, a secondary winding $115_2$, and an auxiliary winding $140_2$. The first and second transformers have separate magnetic cores $145_1$, $145_2$, respectively. FIG. 4 shows the auxiliary windings $140_1$, $140_2$, separate from the primary and secondary windings for clarity. FIG. 7 shows the auxiliary windings disposed adjacent the primary and secondary windings as would be implemented in actual electrical components.

The primary winding $110_1$ of the first transformer $105_1$ and the primary winding $110_2$ of the second transformer $105_2$ are connected in parallel between the power source 120 and transistor 125. The secondary winding $115_1$ of the first transformer $105_1$ and the secondary winding $115_2$ of the second transformer $105_2$ are connected in series, such that an output 150 of the secondary winding $115_2$ of the second transformer $105_2$ is connected to an input 155 of the secondary winding $115_1$ of the first transformer $105_1$. The order in which the secondary windings $115_1$, $115_2$ are series connected may change depending on the implementation. The first secondary winding $115_1$ and the second secondary winding $115_2$ are connected in series with the diode 130 to form an output terminal $V_{out}$ of the continuous load high-power flyback converter 200 for supplying continuous output power to a capacitor Co and a load 135.

By connecting the primary windings $110_1$, $110_2$ in parallel and connecting the secondary windings $115_1$, $115_2$ in series, each transformer $105_1$, $105_2$, can be designed to share half the output power that is supplied to load 135. Thus, if the continuous load high-power flyback converter 200 is intended to provide 100 Watts of power to load 135, two 50 Watt transformers 105 can be used instead of one 100 Watt transformer 105. Similarly, if the continuous load high-power flyback converter 200 is intended to provide 75 Watts of power to load 135, one 50 Watt transformer 105 and one 25 Watt transformer 105, or two 40 Watt transformers 105 can be used instead of one 75 Watt transformer 105.

Connecting the primary windings $110_1$, $110_2$ in parallel between the power source 120 and transistor 125 also reduces the reflected voltage on the transistor 125 when the transistor 125 is in the OFF position. Specifically, the reflected voltage Vref=(NP/NS)*(Vo+Vf)/(number of transformers). For example, where two transformers $105_1$, $105_2$ are used to implement the continuous load high-power flyback converter 200, it is possible to achieve the same output voltage Vo, while generating only half of the reflected voltage Vref on the transistor 125, as compared to using the single transformer design shown in FIG. 1.

Using two or more transformers 105 also helps to evenly distribute the temperature generated by the continuous load high-power flyback converter 200, since the two or more transformers 105 can be physically separated from each other on the printed circuit board. Further, using two or more transformers enables the continuous load high-power flyback converter 200 to be implemented using smaller magnetics, which may help to design a low profile power supply.

As shown in FIG. 4, in some implementations the auxiliary winding $140_1$ of the first transformer $105_1$ and the auxiliary winding $140_2$ of the second transformer $105_2$ are connected in series. Specifically, as shown in FIG. 4, an output 160 of the auxiliary winding $140_2$ of the second transformer $105_2$ is connected to an input 165 of the auxiliary winding $140_1$ of the first transformer $105_1$. The order in which the auxiliary windings $140_1$, $140_2$ are series connected may change depending on the implementation.

Depending on the implementation, it is possible for the first transformer $105_1$ and the second transformer $105_2$ to have different inductances. Further, even if the first transformer $105_1$ and the second transformer $105_2$ are selected to have approximately the same inductance, due to manufacturing tolerances the two similarly configured transformers 105 may have some inductance variation. These two transformers $105_1$, $105_2$, accordingly, may take different amounts of time to fully discharge power through load 135. Connecting the auxiliary windings $140_1$, $140_2$ in series ensures that the zero-crossing detection signal (labeled demagnetization detection in FIG. 4) goes low only after energy from both transformers $105_1$, $105_2$, has been drained from the secondary windings $115_1$, $115_2$. In some implementations the continuous load high-power flyback converter 200 is a stepdown converter.

Figure 5:
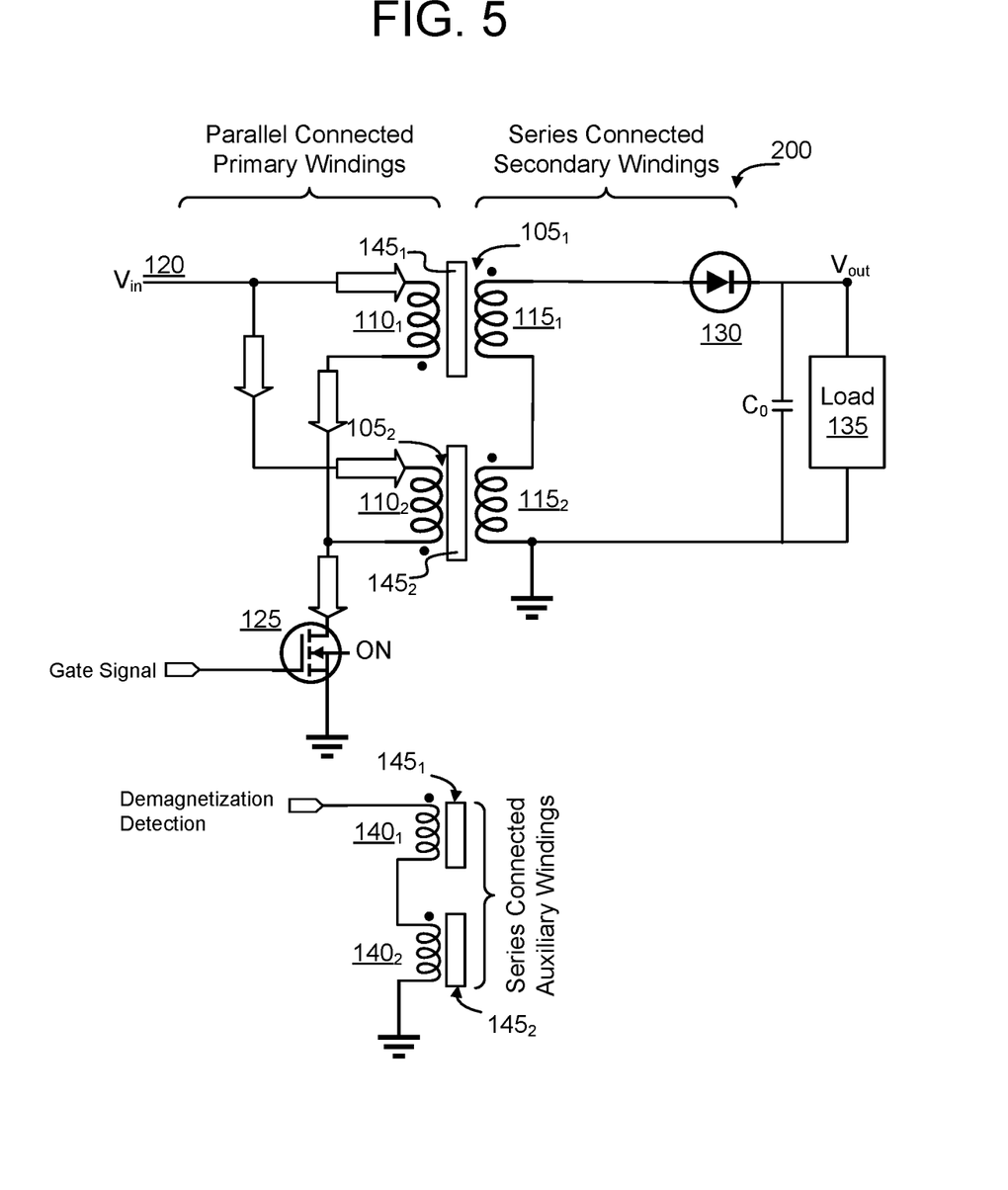

FIG. 5 shows the flow of current in the continuous load high-power flyback converter 200 when the transistor 125 is turned ON. As shown in FIG. 5, when the transistor 125 is turned ON, current flows in parallel through both the primary winding $110_1$ of the first transformer $105_1$ and the primary winding $110_2$ of the second transformer $105_2$. This causes both transformers $105_1$, $105_2$ to be magnetized and store energy. The diode 130 is OFF during this phase due to the negative polarity on the secondary windings $115_1$ $115_2$.

Figure 6:
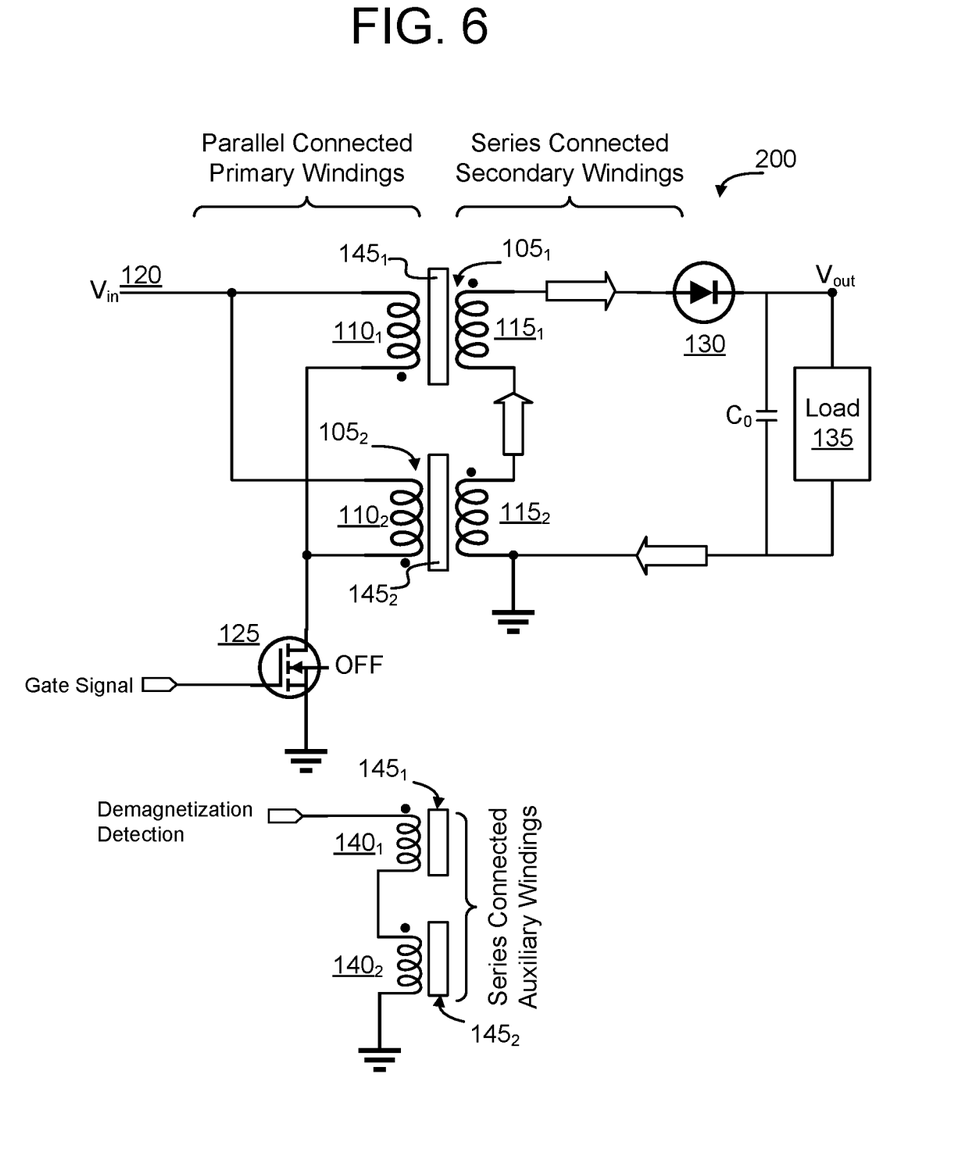
FIG. 6 is a circuit diagram of the example continuous load high-power flyback converter of FIG. 4, showing the flow of electricity when the transistor is turned OFF.

FIG. 6 shows the flow of current in the continuous load high-power flyback converter 200 when the transistor 125 is turned OFF. As shown in FIG. 6, when the transistor 125 is turned OFF, the output diode 130 starts to conduct due to the reversal of polarity on the secondary winding $115_1$ of the first transformer $105_1$ and the secondary winding $115_2$ of the second transformer $105_2$.

After the power stored in the first and second transformer $105_1$, $105_2$ has been transferred to the load 135, the current on the secondary windings $115_1$, $115_2$ will start to approach zero. The first and second auxiliary windings $140_1$, $140_2$ reflect the voltage of the secondary windings $115_1$, $115_2$, respectively. Because the auxiliary windings $140_1$, $140_2$ are connected in series, the demagnetization detection signal will remain high until both secondary windings $115_1$, $115_2$ have discharged to the point where the voltage across both of the secondary winding $115_1$, $115_2$ approaches zero. At that point, the auxiliary windings $140_1$, $140_2$ will start ringing, caused by resonance between the primary inductance of the transformers $105_1$, $105_2$ and parasitic lumped capacitance. This ringing can be used to detect demagnetization of the transformers $105_1$, $105_2$ to cause the transistor 125 to be turned ON again.

FIG. 7 is a circuit diagram showing a continuous load high-power flyback converter 200 according to some implementations. As shown in FIG. 7, in some implementations each transformer $105_1$, $105_2$, is implemented as a separate electrical component with a separate magnetic core $145_1$, $145_2$. For example, if the continuous load high-power flyback converter 200 is to be designed to output 100 Watts of power to load 135, two separate 50 Watt transformers 105 may be used to implement transformers $105_1$, $105_2$.

FIG. 8 is a circuit diagram showing a continuous load high-power flyback converter 200 according to some implementations. As shown in FIG. 8, multiple transformers $105_1$, $105_2$, $105_3$, $105_4$ can be connected such that the primary winding 110 of each transformer $105_1$, $105_2$, $105_3$, $105_4$ is connected in parallel between power source 120 and transistor 125, and such that the secondary windings $115_1$, $115_2$, $115_3$, $115_4$ (collectively 115) of each transformer $105_1$, $105_2$, $105_3$, $105_4$ is connected in series between output $V_{out}$ and ground. Although four transformers $105_1$, $105_2$, $105_3$, $105_4$ are shown in FIG. 8, other numbers of transformers 105 may be connected in this manner. Further, as shown in FIG. 8, the auxiliary windings $140_1$, $140_2$, $140_3$, and $140_4$ of each of the multiple transformers $105_1$, $105_2$, $105_3$, $105_4$ are connected in series to ensure that the transistor 125 is turned ON only after the power has dissipated from each of the secondary windings $115_1$, $115_2$, $115_3$, $115_4$.

By using multiple transformers 105 having parallel connected primary windings 110 and series connected secondary windings 115, it is possible to create a continuous load high-power flyback converter 200 that has higher efficiency and which exhibits lower reflected voltage on the transistor 125, as compared to a flyback converter 100 designed to provide the same output power but using only one transformer 105. This enables the continuous load high-power flyback converter 200 to scale to higher output power while using multiple smaller magnetic cores 145. While the continuous load high-power flyback converter 200 does require a larger number of transformers, which may occupy a larger amount of space on a printed circuit board, the use of multiple transformers 105 enables heat generated by the transformers 105 to be more evenly distributed across the printed circuit board used to implement the continuous load high-power flyback converter 200. The use of multiple smaller transformers can also enable the continuous load high-power flyback converter 200 to have a lower profile, which is advantageous in certain applications.

Figure 9:
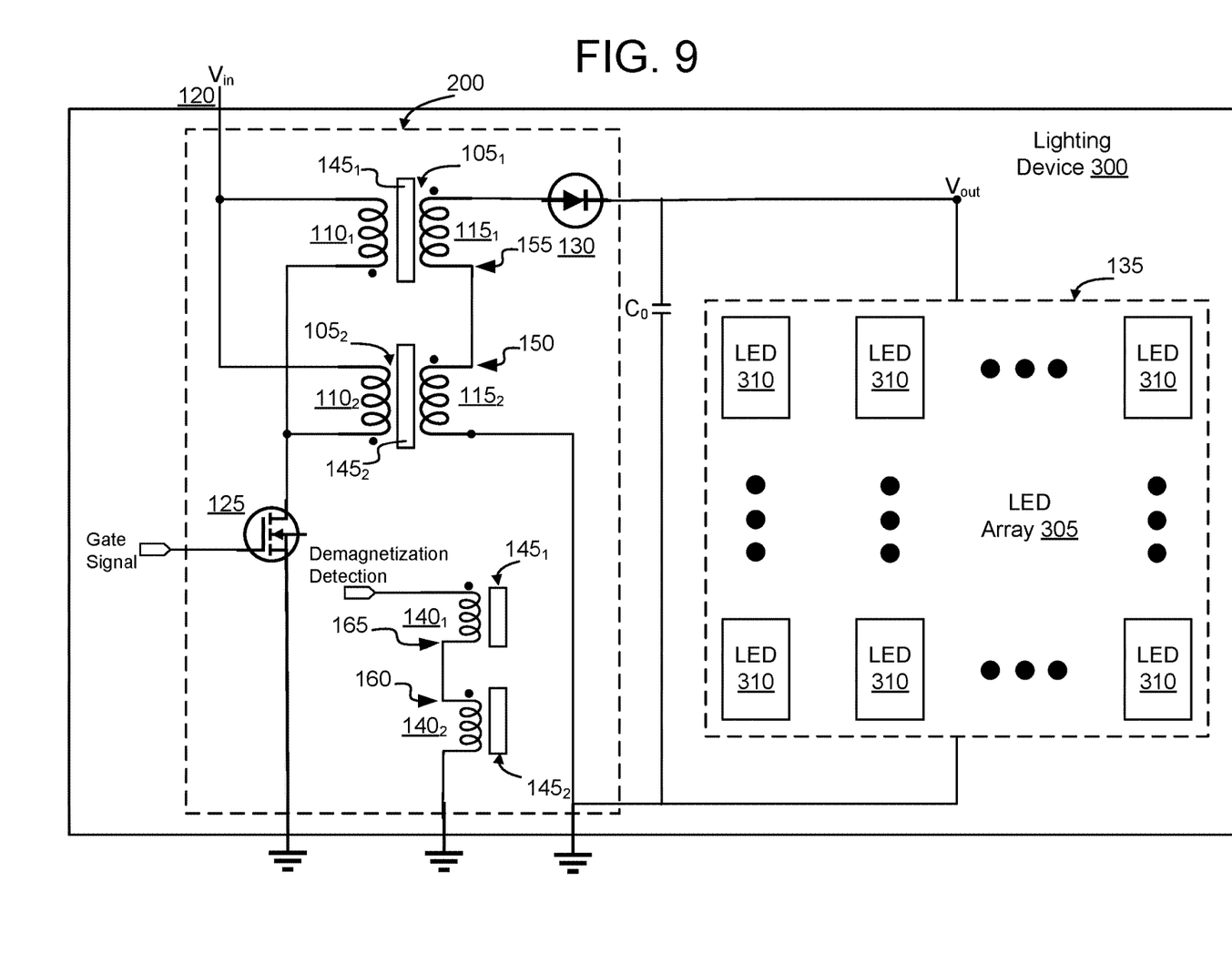
FIG. 9 is a functional block diagram of a lighting device having an LED array connected to a continuous load high-power flyback converter, according to some implementations.

FIG. 9 is a functional block diagram of a lighting device 300 having an LED (Light Emitting Diode) array 305 implemented as a load 135 connected to an output $V_{out}$ of a continuous load high-power flyback converter 200, according to some implementations. As shown in FIG. 9, in some implementations the lighting device 300 has an LED array 305 having multiple LEDS 310 connected to the output $V_{out}$ of a continuous load high-power flyback converter 200 as load 135.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including", and "having" are intended to be inclusive and mean that there may be additional elements other than the listed elements.

Although the methods and systems have been described relative to specific implementations thereof, they are not so limited. Many modifications and variations may become apparent in light of the above teachings. Many additional changes in the details, materials, and arrangement of parts, herein described and illustrated, may be made by those skilled in the art. A number of implementations have been described. Nevertheless, it will be understood that additional modifications may be made without departing from the scope of the inventive concepts described herein, and, accordingly, other implementations are within the scope of the following claims.

What is claimed is:

1. A continuous load high-power flyback converter, comprising:
   a first transformer having a first primary winding, a first secondary winding and a first auxiliary winding;
   a second transformer having a second primary winding, a second secondary winding, and a second auxiliary winding;
   a transistor; and
   a diode;
   wherein:

the first primary winding and the second primary winding are connected in parallel between a power source and the transistor;

the first secondary winding and the second secondary winding are connected in series with the diode to form an output terminal of the continuous load high-power flyback converter for supplying continuous output power to a load; and the first auxiliary winding and the second auxiliary winding are connected in series and used to generate a control signal to control an ON/OFF state of the transistor.

2. The continuous load high-power flyback converter of claim 1, further comprising the load;

wherein the load is an LED (Light Emitting Diode) array.

3. The continuous load high-power flyback converter of claim 2, wherein the LED array has a plurality of LEDS.

4. The continuous load high-power flyback converter of claim 1, wherein the continuous load high-power flyback converter is a stepdown converter.

5. The continuous load high-power flyback converter of claim 1, wherein the first transformer has a first magnetic core, and wherein the second transformer has a second magnetic core.

6. The continuous load high-power flyback converter of claim 1, wherein the first and second transformers are configured such that voltage levels on the first and second auxiliary windings respectively correlate to voltage levels on the first and second secondary windings.

7. The continuous load high-power flyback converter of claim 1, wherein the control signal causes the transistor ON/OFF state to alternate between ON and OFF to implement a quasi-resonance control operation of the continuous load high-power flyback converter.

8. A lighting device, comprising:
a continuous load high-power flyback converter having an input terminal and an output terminal; and
an LED (Light Emitting Diode) array connected to the output terminal;
the continuous load high-power flyback converter comprising:
a first transformer having a first primary winding, a first secondary winding and a first auxiliary winding;
a second transformer having a second primary winding, a second secondary winding, and a second auxiliary winding;
a transistor; and
a diode;
wherein:
the first primary winding and the second primary winding are connected in parallel between a power source and the transistor;
the first secondary winding and the second secondary winding are connected in series with the diode to form the output terminal; and
the first auxiliary winding and the second auxiliary winding are connected in series and used to generate a control signal to control an ON/OFF state of the transistor.

9. The lighting device of claim 8, wherein the LED array has a plurality of LEDS.

10. The lighting device of claim 8, wherein the continuous load high-power flyback converter is a stepdown converter.

11. The lighting device of claim 8, wherein the first transformer has a first magnetic core, and wherein the second transformer has a second magnetic core.

12. The lighting device of claim 8, wherein the first and second transformers are configured such that voltage levels on the first and second auxiliary windings respectively correlate to voltage levels on the first and second secondary windings.

13. The lighting device of claim 8, wherein the control signal causes the transistor ON/OFF state to alternate between ON and OFF to implement a quasi-resonance control operation of the continuous load high-power flyback converter.

* * * * *